United States Patent [19]

Marinangeli et al.

[11] Patent Number: 5,207,927
[45] Date of Patent: May 4, 1993

US005207927A

[54] TREATMENT OF AN AQUEOUS STREAM CONTAINING WATER-SOLUBLE INORGANIC SULFIDE COMPOUNDS

[75] Inventors: Richard E. Marinangeli, Arlington Heights; Tom N. Kalnes, La Grange, both of Ill.

[73] Assignee: UOP, Des Plaines, Ill.

[21] Appl. No.: 853,555

[22] Filed: Mar. 18, 1992

[51] Int. Cl.$^5$ .............................. C02F 1/72; C02F 1/74
[52] U.S. Cl. .................................... 210/763; 210/916; 423/544
[58] Field of Search ............... 210/758, 761, 762, 763, 210/916; 423/544, 545, 551, 554, 555

[56] References Cited

U.S. PATENT DOCUMENTS

| | | | |
|---|---|---|---|
| 3,029,201 | 4/1962 | Brown et al. | 210/763 |
| 3,029,202 | 4/1962 | Brown | 210/63 |
| 3,186,942 | 6/1965 | Benger | 210/763 |
| 3,672,836 | 6/1972 | Brown | 23/224 |
| 3,844,942 | 10/1974 | Barber | 210/721 |
| 4,292,293 | 9/1981 | Johnson et al. | 210/758 |
| 4,363,215 | 12/1982 | Sharp | 210/763 |
| 4,478,725 | 10/1984 | Velling et al. | 210/763 |
| 4,839,154 | 6/1989 | Allison et al. | 210/758 |
| 4,855,123 | 8/1989 | Suzuki et al. | 210/763 |
| 4,925,569 | 5/1990 | Chou et al. | 210/763 |

*Primary Examiner*—Stanley S. Silverman
*Assistant Examiner*—Neil M. McCarthy
*Attorney, Agent, or Firm*—Thomas K. McBride; John G. Tolomei; John G. Cutts, Jr.

[57] ABSTRACT

A method for treating an aqueous stream containing a water-soluble, inorganic sulfide compound wherein the stream is contacted with oxygen at a pH in the range of less than about 12 and an oxygen to sulfur molar ratio greater than about 5 with an oxidizing catalyst at oxidation conditions selected to provide a high conversion of the inorganic sulfide compound to sulfate to thereby produce a substantially sulfide-free treated aqueous product stream.

12 Claims, No Drawings

TREATMENT OF AN AQUEOUS STREAM CONTAINING WATER-SOLUBLE INORGANIC SULFIDE COMPOUNDS

BACKGROUND OF THE INVENTION

The field of art to which this invention pertains is the treatment of aqueous streams containing water-soluble inorganic sulfide compounds. More specifically, the invention is directed toward a method for treating an aqueous stream containing a water-soluble, inorganic sulfide compound.

INFORMATION DISCLOSURE

U.S. Pat. No. 3,672,836 (Brown) discloses a process wherein an aqueous stream containing a water-soluble, inorganic sulfide compound is treated by contacting the aqueous stream and oxygen, in an amount selected to react less than 0.5 mol of oxygen per mol of sulfide compound with a first oxidizing catalyst at oxidizing conditions, including a relatively low pressure and temperature, selected to form an effluent stream containing a water-soluble polysulfide; and thereafter by contacting the polysulfide-containing effluent stream and oxygen in an amount less than the amount utilized in the first step, with a second oxidizing catalyst at oxidizing conditions, including a temperature greater than, or equal to, the melting point of sulfur and a pressure sufficient to maintain at least a portion of the effluent stream in the liquid phase, selected to produce liquid sulfur and a substantially sulfide-free treated water stream.

Key features of the '836 patent involve the use of a first catalytic oxidation step which is run at relatively low temperatures and pressures to produce polysulfide, coupled with a second catalytic oxidation step which is run at relatively high temperatures and pressures to selectively oxidize the polysulfide to elemental sulfur, thereby preventing the deposition of elemental sulfur on the catalyst used during these oxidation steps while simultaneously minimizing the amount of oxygen which must be supplied at the relatively high pressures.

U.S. Pat. No. 3,029,202 (Brown) discloses a method of treating waste water containing a sulfur impurity which comprises reacting the sulfur impurity with ascending air in contact with a phthalocyanine catalyst during descent of the water in a cooling tower. Although a portion of the sulfur impurities are converted to sulfates, the sulfur impurities are primarily converted to the corresponding thiosulfates.

In various industrial applications, water containing sulfur impurities is collected prior to disposal. For example, in a petroleum refinery, large quantities of water are used in refining operations such as purifying hydrocarbon fractions, steam distillation, heat transfer, and dilution of corrosive materials. The more abundant impurities are hydrogen sulfide, mercaptans and thiophenols. With the increase in the size of petroleum refineries and in the number of processing steps in refinery operations, the amount of impurities in the water is increased to an extent that may be harmful to marine life when the waste water is disposed of in the neighboring streams.

The impurities in waste water from the petroleum refineries include ammonium sulfide, sodium sulfide, potassium sulfide, mercaptans and hydrogen sulfide. Although these impurities comprise a minute portion of a large volume of water, the sulfides consume oxygen when disposed in neighboring streams and rob aquatic life of necessary oxygen. Therefore, those skilled in the art constantly seek to find techniques which eliminate water-soluble inorganic sulfide compounds from aqueous waste streams. In accordance with the present invention, we have discovered a novel method to convert sulfide impurities in waste water by treating the water-soluble inorganic sulfide compounds to a form having essentially no oxygen demand.

BRIEF SUMMARY OF THE INVENTION

The invention provides a process for treating an aqueous stream containing a water-soluble, inorganic sulfide compound by contacting the aqueous stream and air or oxygen at a pH less than about 12 and an oxygen to sulfur molar ratio greater than about 5 with an oxidizing catalyst at oxidation conditions selected to provide a high conversion of the inorganic sulfide compound to sulfate.

One broad embodiment of the present invention is a method for treating an aqueous stream containing a water-soluble, inorganic sulfide compound which method comprises the steps of: (a) contacting the aqueous stream and oxygen at a pH in the range less than about 12 and an oxygen to sulfur molar ratio greater than about 5 with an oxidizing catalyst at oxidation conditions selected to provide a high conversion of the inorganic sulfide compound to sulfate; and (b) recovering a substantially sulfide-free treated aqueous stream.

Other embodiments of the subject invention encompass further details such as sources of aqueous feed streams, oxidation catalysts, and oxidation operating conditions, all of which are hereinafter disclosed in the following discussion of each of these facets of the invention.

DETAILED DESCRIPTION OF THE INVENTION

As part of the price that has to be paid for a modern industrial society, large quantities of aqueous solutions of inorganic sulfide compounds are currently being produced, or could be produced from a large number of diverse industrial sources. In particular, aqueous solutions containing sulfide salts are by-products of many economically significant industrial processes in the chemical, petroleum, steel, manufactured gas, natural gas, paper pulp, and the like industries. These aqueous solutions containing sulfide salts have, in the past, generally been regarded as waste water streams which are to be disposed of at the lowest possible cost. In many cases, this last requirement has dictated the discharge of these waste streams into sewer systems, or surrounding streams and/or lakes and bays. With the advent of the growing public concern over the substantial water pollution problems thereby produced, this direct discharge of these streams is becoming less and less an acceptable alternative. In fact, because these streams contain sulfide salts which have a substantial chemical oxygen demand and cause substantial water pollution problems, a growing number of states and the federal government are imposing stringent requirements on the discharge of this type of waste steam. In many situations where these waste streams are produced, it is, moreover, desired to recover a treated water stream which can be recycled to the industrial process from which the sulfide-containing water stream originally came in order to minimize the requirements for make-up water. For example, in the petroleum industry, a water stream is typically utilized to remove ammonium hydrosulfide salts from the effluent equipment train associated with such hydrocarbon conversion processes as hydrorefining, hydrocracking, catalytic cracking and reforming, wherein ammonia and hydrogen sulfide by-products are produced. The original purpose for injecting the water stream into these processes was to remove these detrimental ammonium hydrosulfide salts which can form in the heat transfer equipment that is utilized in these processes to cool the effluent stream from the hydrocarbon conversion step. These salts, if not removed from this equipment, accumulate therein and eventually restrict the passage of the effluent stream therethrough. The waste stream so formed presented a substantial pollution hazard insofar as it contains sulfide salts, which are considered hazardous due to reactivity. In addition, sulfides are toxic to oxidation promoting bacteria and have a substantial biochemical oxygen demand, and ammonia which is a nutrient that leads to excessive growth of marine organisms. Another example is encountered in many industrial processes where it is desired to remove hydrogen sulfide from a mixture of gases containing the same with a suitable scrubbing solution which generally is an aqueous alkaline solution or an aqueous ammoniacal solution. The scrubbing solution reacts with the hydrogen sulfide to produce sulfide salts, and the resulting solution must be either regenerated or disposed of. These last sulfide solutions are typical of those that can be treated by the method of the present invention in order to convert the sulfide contained therein into aqueous solutions containing sulfate, to minimize the biochemical oxygen demand of the resulting treated solution, and to prepare an essentially sulfide-free treated water stream which is suitable for reuse.

The water-soluble inorganic sulfide compound present in these aqueous streams is generally present as a salt of a common base such as ammonium sulfide or hydrosulfide; and alkali metal sulfide such as sodium sulfide or hydrosulfide, potassium sulfide or hydrosulfide; an alkaline earth metal sulfide such as calcium sulfide or hydrosulfide; and the like compounds. In this respect, it should be remembered that hydrogen sulfide, because of its polar nature, is soluble in aqueous solutions to some degree, even in the absence of an appropriate solubility increasing agent; for example, at 20° C. and 1 atmosphere pressure, 2.5 ml of hydrogen sulfide will dissolve in 1 ml of water. Thus, hydrogen sulfide is a water-soluble inorganic sulfide compound.

We have now found a method for treating these aqueous streams containing water-soluble sulfide compounds in order to selectively convert essentially all of the sulfur values to sulfate. At this point, it is to be recognized that an essential feature of the present invention is the utilization of oxidation conditions which selectively produce sulfate while avoiding the production of polysulfide, elemental sulfur or any other sulfur compounds.

The aqueous stream containing a water-soluble sulfide compound that is the principal input stream to the present process may be produced in one or more of the number of industrial processes that are faced with a water disposal problem of this kind. Typically, the water-soluble inorganic sulfide compound present in this stream will be selected from one or more of the following classes: 1) hydrogen sulfide; 2) ammonium sulfide or hydrosulfide; 3) alkali metal sulfides or hydrosulfides such as sodium sulfide or hydrosulfide, potassium sulfide or hydrosulfide; 4) alkaline earth metal sulfides or hydrosulfides such as the sulfides or hydrosulfides of calcium, strontium, or barium and the like compounds. Similarly, the amount of the sulfide compound present in these aqueous streams may vary over a wide range up to the solubility limit of the particular salt in water. Typically, the amount of the water-soluble sulfide compound contained in the waste stream charged to the first step is about 0.01 to about 20 wt. % calculated as equivalent sulfur of this stream. For example, a typical water stream from a hydrocracking plant contains about 6 wt. % sulfur as ammonium hydrosulfide. In general, the method of the present invention gives excellent results when the aqueous stream charged thereto contains ammonium hydrosulfide. In accordance with the present invention, it is essential that the contacting step of the aqueous stream and oxygen is conducted in the presence of an oxidizing catalyst at oxidation conditions which include a pH less than about 12. The pH of the aqueous stream may be maintained by the addition of one or more components or buffering agents which serve to maintain the pH of the aqueous solution at the required pH. Examples of buffering agents include metal salts of weak acids such as alkali metal carbonates, alkali metal phosphates; ammonium hydroxide; metal salts of strong acids such as ammonium chloride; organic bases such as methyl amine, ethyl amine, ethanol amine and others well known in the art.

An essential reactant for the method of the present invention is oxygen. This may be utilized in any suitable form either by itself or mixed with other relatively inert gases. In general, because of economic factors, it is preferred to utilize air streams as the source for the necessary oxygen in the oxidation step of the present invention. The amounts of oxygen utilized in the two oxidation steps of the present invention are discussed hereinafter.

The catalyst utilized in the oxidation steps of the present invention can generally be any suitable oxidizing catalyst that is capable of effecting substantially complete conversion of the water-soluble sulfide compound contained in the input aqueous stream. A particularly preferred class of catalysts for the oxidation step are metal phthalocyanines. Examples of suitable carrier materials for metal phthalocyanines are charcoal, such as wood charcoal or bone charcoal, which may or may not be activated prior to use; naturally occurring or synthetically prepared refractory inorganic oxides such as alumina, silica, zirconia, kieselguhr, bauxite, pillared clay, and high silica zeolites; and activated carbons and other similar activated carbon carrier materials familiar to those skilled in the art. The preferred carrier material is activated carbon.

The preferred oxidizing catalysts for use in the oxidation step comprise a metallic phthalocyanine compound combined with a suitable porous carrier material such as activated carbon, for example. Particularly preferred metal phthalocyanine compounds include those of the iron group metals and vanadium. Other metal phthalocyanine compounds that may be utilized include those of copper, molybdenum, manganese, or tungsten. Best results are ordinarily obtained when the metal phthalocyanine is a cobalt phthalocyanine compound. Moreover, any suitable derivative of the metal phthalocyanine may be employed including the sulfonated derivatives and the carboxylated derivatives, with the monosulfonated and polysulfonated derivative being particularly preferred. In general, the phthalocyanine compound is preferably utilized as a composite with a suitable adsorptive carrier material such as the ones enumerated above, and the preferred carrier material is activated carbon. The amount of the phthalocyanine compound combined with the carrier material may be any amount which is catalytically effective. However, because of the high activity of the metal phthalocyanine catalyst, good results are ordinarily obtained when it comprises about 0.001 to about 5 wt. % of the composite with best results obtained when it comprises about 0.01 to about 2 wt. % of the composite.

Although the oxygenation step can be performed according to any of the methods taught in the art for contacting a liquid stream and a gas stream with a solid catalyst, the preferred system involves a fixed bed of the solid oxidizing catalyst disposed in a treatment zone. The aqueous input stream is then passed therethrough in either upward, radial or downward flow and the oxygen or air stream is passed thereto in either cocurrent or countercurrent flow relative to the aqueous waste stream. The preferred mode is downflow and cocurrent flow for the oxidizing step.

According to the present invention, the oxidation step involves contacting in a treatment zone the aqueous input stream and oxygen with a bed of oxidizing catalyst of the type hereinabove described at conditions which include a pH of less than about 12 and an oxygen to sulfur mole ratio of greater than about 5. Other preferred operating conditions utilized in the oxidation step include a temperature of about 257° F. (125° C.) to about 347° F. (175° C.) and preferably about 284° F. (140° C.) to about 320° F. (160° C.); a pressure of about 1 psig (7 kPa gauge) to about 500 psig (3447 kPa gauge) and preferably about 1 psig (7 kPa gauge) to about 200 psig (1379 kPa gauge); and a liquid hourly space velocity (defined to be the volume rate per hour of charging the aqueous waste stream divided by the total volume of the catalyst bed) selected from the range of about 0.05 to about 20 $hr^{-1}$, with a preferred value being about 0.1 to about 3 $hr^{-1}$. The oxidation step is further conducted with an oxygen to sulfur mole ratio of greater than about 5 based upon the water-soluble sulfide compound contained in the aqueous stream to react with essentially all of the sulfide compound. A preferred pressure is selected from the range corresponding to about 1 to about 1½ times the minimum pressure required to maintain water in the liquid phase at the temperature selected to be utilized in the oxidation step.

In accordance with the present invention, the reaction conditions include a pH of less than about 12 to achieve the desired results of having essentially complete oxidation of the sulfide compounds to sulfate. During the reaction, it may be desirable to control the pH to maintain the desired reaction conditions by means of the addition of a neutralizing or buffering agent. Suitable neutralizing or buffering agents may be selected from sodium chloride, sodium bicarbonate, ammonium hydroxide and other related compounds.

In addition to the conversion of water-soluble, inorganic sulfide compounds to sulfate in the oxidation zone, an additional advantage is achieved because the preferred catalyst support is activated carbon which serves as an adsorbent to remove trace quantities of hydrocarbon compounds and/or other organic compounds which may be present in the aqueous feed streams. Since an important feature of water clean-up or remediation is the removal of organic compounds, the process of the present invention achieves a multifaceted and desirable result.

Following the oxidation step, an effluent stream is withdrawn therefrom. This effluent stream typically comprises a treated aqueous stream which is substantially free of the water-soluble sulfide compound originally present in the input aqueous stream. In addition, the aqueous stream will contain sulfate salts. In the case where the oxygen is supplied to the oxidation step via an air stream, the effluent stream withdrawn from the oxidation step will contain a minor amount of inert nitrogen which is easily separated therefrom in a suitable gas separating means.

In some cases, it may be desirable or economically expedient to recover the resulting sulfate as a product for use elsewhere. The recovery of sulfate from an aqueous solution is known in the art and any suitable technique may be utilized for this recovery. With the removal of sulfate from water, even greater remediation is achieved by the removal of dissolved solids.

The following examples are presented for the purpose of further illustrating the process of the present invention and to indicate the benefits afforded by the utilization thereof in producing a substantially sulfide-free treated aqueous stream.

EXAMPLE I

An aqueous stream having the characteristics presented in Table 1 was introduced into an oxidation reaction zone containing a fixed bed of oxygenation catalyst at conditions which included a pressure of 100 psig, a temperature of 145° C. (293° F.), a liquid hourly space velocity (LHSV) of 0.5 $hr^{-1}$ and an oxygen to sulfur molar ratio of 6. The oxidation catalyst was monosulfonated cobalt phthalocyanine supported on activated carbon.

TABLE 1

| Feedstock Analysis (Ammonium Sulfide Solution) | |
|---|---|
| pH | 10.9 |
| Sulfide, weight percent | 1.75 |
| Phenol, weight ppm | 835 |
| Aromatic Hydrocarbon Compounds, weight ppm | 500 |

The resulting effluent from the oxidation reaction zone was recovered and analyzed. The test results are presented in Table 2.

TABLE 2

| Product Analysis | |
|---|---|
| pH | 10.7 |
| Sulfide, weight percent | 0 |
| Phenol, weight ppm | 90 |
| Aromatic Hydrocarbon Compounds, weight ppm | 0 |
| $SO_4^=/(SO_4^= + S_2O_3^=)$, % | 99.6 |

In summary, there was complete conversion of the sulfide contained in the feed and the selectivity of the conversion of the sulfide to sulfate was 99.6%, based on detectable sulfur species in the product. Therefore, it is concluded that a high conversion of sulfide to sulfate was achieved at these operating conditions. The concentration of the aromatic hydrocarbon compounds was reduced from 500 wppm to 0 and the phenol concentration was reduced from 835 wppm to 90 wppm.

EXAMPLE II

An aqueous stream having the characteristics presented in Table 3 was introduced into an oxidation reaction zone containing a fixed bed of oxygenation catalyst at conditions which included a pressure of 100 psig, a temperature of 142° C. (289° F.), a liquid hourly space velocity (LHSV) of 0.5 hr$^{-1}$ and an oxygen to sulfur molar ratio of 7. The oxidation catalyst was monosulfonated cobalt phthalocyanine supported on activated carbon.

TABLE 3

Feedstock Analysis
(Sodium Sulfide Solution - Na$_2$CO$_3$ Buffer)

| | |
|---|---|
| pH | 11.4 |
| Sulfide, weight percent | 0.78 |
| Chloride, weight percent | 2.0 |
| Sodium, weight percent | 4.1 |
| Carbonate (as CO$_3$=), weight percent | 2.2 |

The resulting effluent from the oxidation reaction zone was recovered and analyzed. The test results are presented in Table 4.

TABLE 4

Product Analysis

| | |
|---|---|
| pH | 9.2 |
| Sulfide, weight percent | 0 |
| Chloride, weight percent | 2.0 |
| Sulfate, weight percent | 2.25 |
| SO$_4$=/SO$_4$= + S$_2$O$_3$=), % | 98.7 |

In summary, there was complete conversion of the sulfide contained in the feed and the selectivity of the conversion of the sulfide to sulfate was 98.7%, based on detectable sulfur species in the product. Therefore, it is concluded that a high conversion of sulfide to sulfate was achieved at these operating conditions.

The foregoing description and examples clearly illustrate the advantages encompassed by the method of the present invention and the benefits to be afforded with the use thereof.

What is claimed is:

1. A method for treating an aqueous stream containing a water-soluble, inorganic sulfide compound which method comprises the steps of:

(a) contacting said aqueous stream and oxygen at a pH in the range less than about 12 and an oxygen to sulfur molar ratio greater than about 5 with a metallic phthalocyanine oxidizing catalyst at oxidation conditions selected to provide a high conversion of said inorganic sulfide compound in an amount greater than about 95 weight percent to sulfate; and (b) recovering a substantially sulfide-free treated aqueous stream.

2. The method of claim 1 wherein said sulfide compound is selected from the group consisting of ammonium sulfide, ammonium hydrosulfide, an alkali metal sulfide, an alkali metal hydrosulfide, an alkaline earth metal sulfide, hydrogen sulfide and an alkaline earth metal hydrosulfide.

3. The method of claim 1 wherein said oxidizing catalyst comprises a metallic phthalocyanine combined with a porous carrier material.

4. The method of claim 3 wherein said metallic phthalocyanine is an iron group metal phthalocyanine.

5. The method of claim 4 wherein said iron group metal phthalocyanine is cobalt phthalocyanine monosulfonate.

6. The method of claim 3 wherein said porous carrier material is activated carbon.

7. The method of claim 1 wherein said oxidizing conditions include a temperature from about 257° F. (125° C.) to about 347° F. (175° C.), a pressure from about 1 psig (7 kPa gauge) to about 500 psig (3447 kPa gauge), a liquid hourly space velocity from about 0.05 hr$^{-1}$ to about 20 hr$^{-1}$.

8. The method of claim 1 wherein the pressure utilized in said contacting step is about 1 to about 1.5 times the minimum pressure required to maintain water in the liquid phase at the specific temperature utilized.

9. The method of claim 1 wherein the sulfur concentration of said aqueous stream containing a water-soluble, inorganic sulfide compound is less than about 5 weight percent sulfide.

10. The method of claim 1 wherein said pH is controlled by the addition of a neutralizing or buffering agent.

11. The method of claim 10 wherein said neutralizing or buffering agent is selected from the group consisting of sodium chloride, sodium bicarbonate and ammonium hydroxide.

12. The method of claim 1 wherein said sulfide-free treated aqueous stream is processed to recover said sulfate.

* * * * *